(12) United States Patent
Torisawa et al.

(10) Patent No.: US 6,715,927 B1
(45) Date of Patent: Apr. 6, 2004

(54) ROLLING BEARING AND BEARING APPARATUS

(75) Inventors: Hideto Torisawa, Kuwana (JP); Michiyoshi Ishimaru, Kuwana (JP); Hiromitsu Kondo, Kuwana (JP); Akihiko Tomiya, Kuwana (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/526,202

(22) Filed: Mar. 15, 2000

(30) Foreign Application Priority Data

Mar. 19, 1999 (JP) ............................. 11-076384
Apr. 1, 1999 (JP) ............................. 11-095205

(51) Int. Cl.$^7$ ............................. F16C 33/46
(52) U.S. Cl. ....................... 384/572; 384/576
(58) Field of Search ............................. 384/576, 580, 384/534, 523, 578, 572

(56) References Cited

U.S. PATENT DOCUMENTS

| | | | |
|---|---|---|---|
| 4,613,239 A | | 9/1986 | Hofmann et al. |
| 4,728,204 A | * | 3/1988 | Colanzi et al. ............. 384/580 |
| 5,772,338 A | | 6/1998 | Hillmann et al. |
| 6,102,579 A | * | 8/2000 | Kupietz ...................... 384/572 |

FOREIGN PATENT DOCUMENTS

| | | |
|---|---|---|
| DE | 19612307 | 10/1997 |
| EP | 0471403 | 2/1992 |
| JP | 08042578 | 2/1996 |
| JP | 08200379 | 8/1996 |
| JP | 10037949 | 2/1998 |
| JP | 10184704 | 7/1998 |
| JP | 11030240 | 2/1999 |

\* cited by examiner

Primary Examiner—Lenard A. Footland
(74) Attorney, Agent, or Firm—Arent Fox Kintner Plotkin & Kahn, PLLC

(57) ABSTRACT

A rolling bearing provided with measures to suppress a rise in temperature. The rolling bearing comprises inner and outer races, a plurality of rolling elements 16 interposed between the inner and outer races, and a cage for retaining the rolling elements 16. On the use conditions that the direction of load is stationary to the outer/inner race and rotational with respect to the inner/outer race of the two races, the cage 17 is guided for rotation with outer/inner regions of its pocket surfaces in contact with the rolling elements 16. It is also intended to facilitate satisfactory lubrication by means of grease and to enhance the durability and life of the bearing. For that purpose, a bearing 21 incorporated into a main motor is arranged with both end faces adjoining end members 24 and 25 that have grease pockets 22 and 23 formed therein, respectively. The bearing 21 includes an outer race 27 whose bore surfaces 33 and 34 on its ribs 31 and 32 are flush with the inner peripheries 35 and 36 of the grease pockets 22 and 23 in the end members 24 and 25, respectively.

2 Claims, 12 Drawing Sheets

Fig. 1
(a)
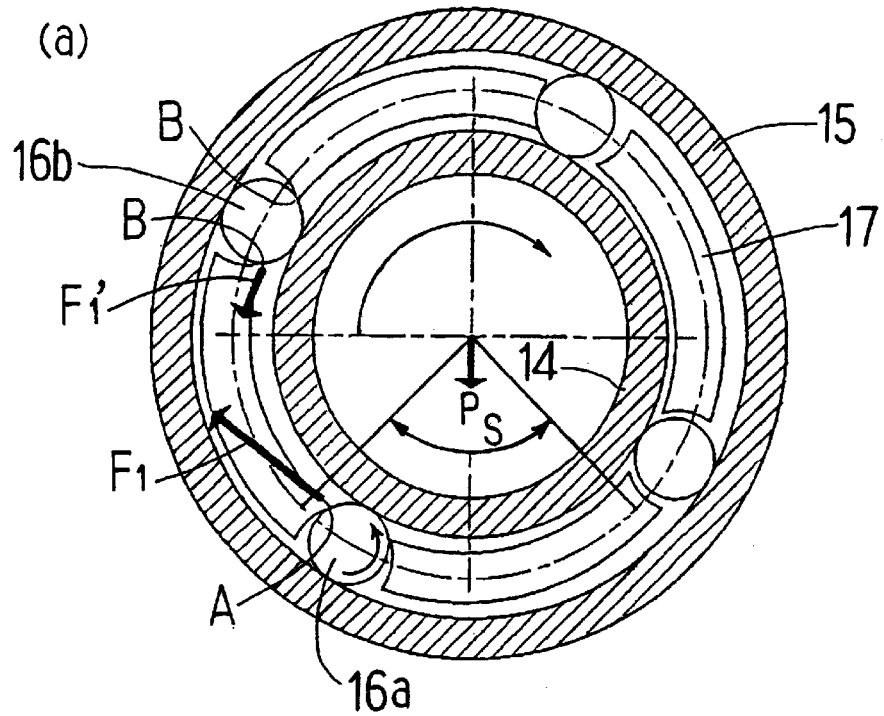
(b)
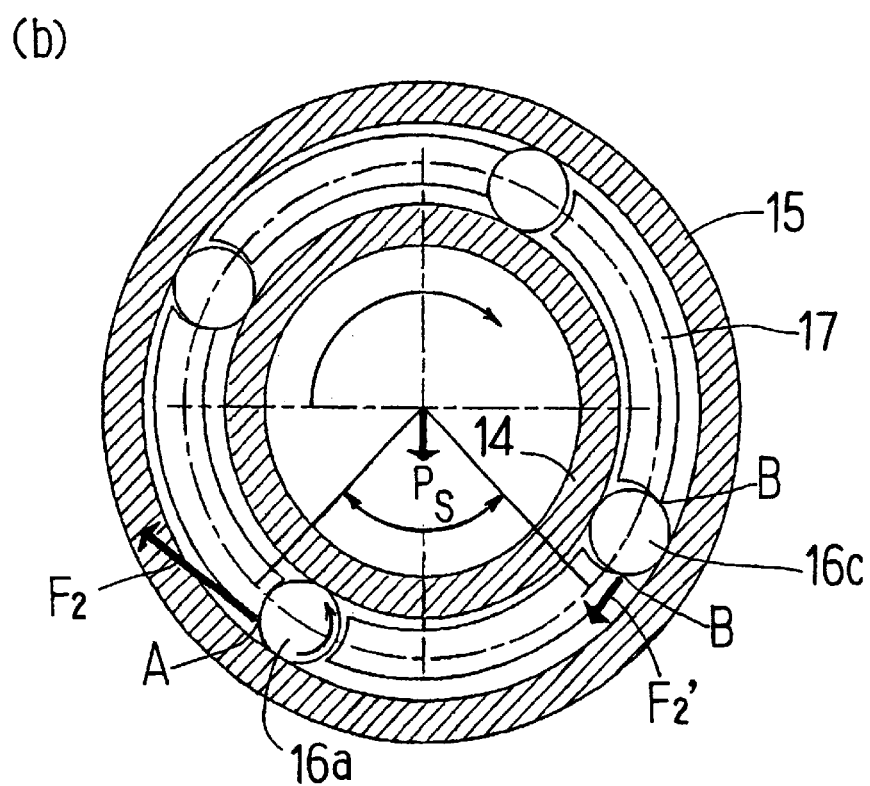

Fig. 2
(a)
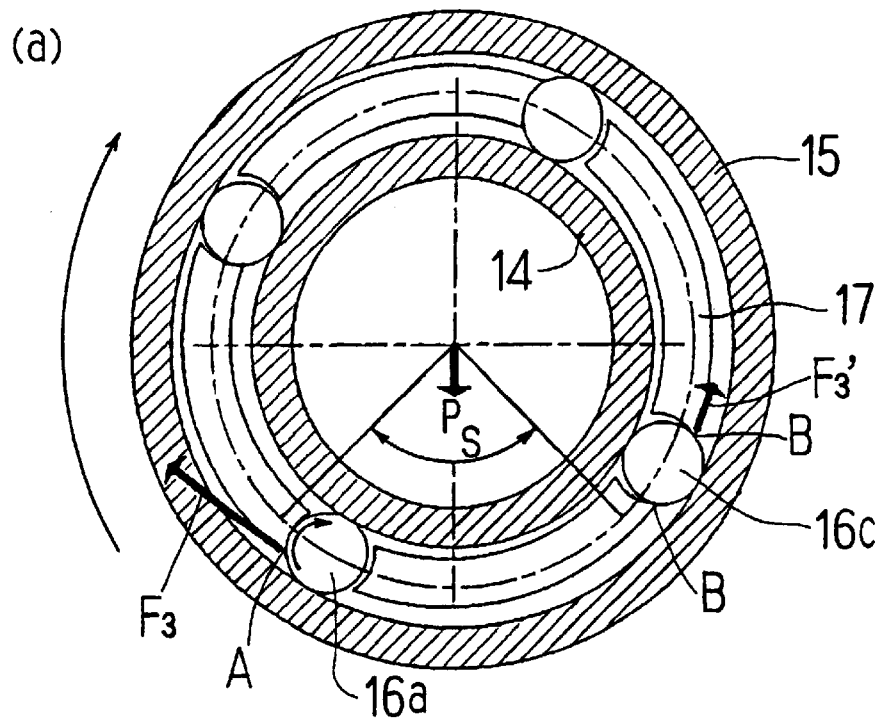
(b)
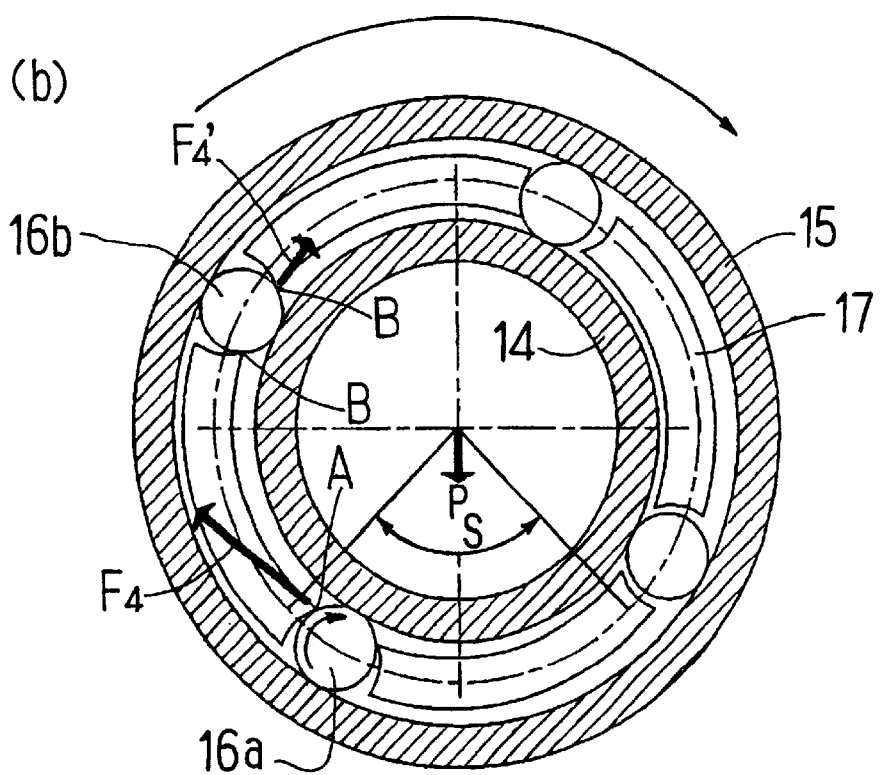

ROLLING BEARING AND BEARING APPARATUS

BACKGROUND OF THE INVENTION

1. Field of the Invention

The present invention relates to a low temperature rise type rolling bearing for use in such applications as speedup gears in a wind power generator. The present invention also relates to a bearing apparatus hard to supply grease periodically, such as a bearing apparatus incorporated into a main motor or the like to support the armature shaft of the main motor rotatably.

2. Description of the Related Art

During operation, a rolling bearing inevitably generates heat. Such generation of heat is attributed to ① agitation heat produced by the rolling elements and the cage agitating the lubricant, ② frictional heat caused by slides among components, such as those between the cage and the rolling elements and between the cage and the races, ③ frictional heat produced by rolling friction between the rolling elements and the races, and the like.

The generation of heat may cause a significant rise in the temperature of the rolling bearing to pose problems including a larger amount of lubricating oil necessary to cool the bearing, a greater, more complicated lubricating system, a greater loss of power consumed in elevating the bearing temperature, and a shorter life of the lubricant resulting from thermal degradation taking place. On that account, numbers of measures have been proposed to suppress the rise in temperature. None of these measures is, however, free from other problems such as complicated structure, higher costs, and deteriorated bearing functions. Accordingly, there has been a need for further improvements.

FIG. 16 shows a main motor X mounted on a railcar or the like, incorporating a bearing 2 for rotatably supporting an armature shaft 1. As shown in FIG. 17, this bearing 2 is arranged with both end faces adjacent to end members 5 and 6. The end members 5 and 6 have concave grease pockets 3 and 4 for reserving grease (not shown), respectively. The bearing 2 and the end members 5 and 6 constitute a rolling bearing apparatus. In this rolling bearing apparatus, the oil component contained in the grease in the grease pockets 3 and 4 is supplied into the bearing 2 to provide long-term lubrication for the bearing 2.

The above-mentioned bearing 2 is essentially composed of an inner race 7 fitted and fastened onto the armature shaft 1 as shown in FIG. 18, an outer race 8 positioned and fixed to a not-shown housing or the like, and rolling elements 11 such as cylindrical rollers. The rolling elements 11 are interposed between rolling contact surfaces 9 and 10 formed on the raceways of the inner and outer rings 7 and 8, respectively. On both axial ends of the outer race 8 are formed ribs 12 and 13 each projecting radially inwardly from the rolling contact surface 10.

Meanwhile, the end members 5 and 6, arranged to adjoin both ends of the bearing 2, have the grease pockets 3 and 4 which are formed to communicate with open ends of the bearing 2 between the inner and outer races 7 and 8. These grease pockets 3 and 4 reserve grease whose oil component flows over the bore surfaces on the ribs 12 and 13 of the outer race 8 to the inside of the bearing 2 for lubrication.

As mentioned above, the inner race 7 of the bearing 2 is fitted and fastened onto the armature shaft 1 and therefore rotates in operation, whereas the outer race 8 is fixed to the housing or the like. Accordingly, the oil component of the grease, when supplied from the grease pockets 3 and 4 to the inside of the bearing 2, flows into the bearing 2 via the ribs 12 and 13 at the lower part of the outer race 8.

However, since the oil component of the grease to be supplied is very small in quantity and the ribs 12 and 13 of the outer race 8 constitute barriers there, the oil component ceases to flow, thereby making it difficult to provide adequate supply thereof. This difficulty in achieving satisfactory lubrication greatly lowers the durability of the bearing 2, causing a problem of shortening the life of the bearing 2.

SUMMARY OF THE INVENTION

An object of the present invention is to provide a rolling bearing with new measures to suppress a rise in temperature. To achieve the foregoing object, the present invention provides a rolling bearing which comprises a pair of races, a plurality of rolling elements interposed between the races, and a cage for retaining the rolling elements, an inner race of the pair of races being rotated in operation, the cage being guided with outer regions of its pocket surfaces in contact with the rolling elements. The present invention also provides a rolling bearing which comprises a pair of races, a plurality of rolling elements interposed between the races, and a cage for retaining the rolling elements, an outer race of the pair of races being rotated in operation, the cage being guided with inner regions of its pocket surfaces in contact with the rolling elements.

Due to the configurations that the cage in a rolling bearing whose inner race is rotated in operation is guided with outer regions of its pocket surfaces in contact with the rolling elements, and that the cage in a rolling bearing whose outer race is rotated in operation is guided with inner regions of its pocket surfaces in contact with the rolling elements, the slide resistance between the rolling elements and each cage can be reduced to suppress the generation of heat resulting from friction in the slide portions. This offers inexpensive, simple-structured measures to suppress a rise in temperature while maintaining the bearing functions.

Another object of the present invention is to facilitate satisfactory lubrication by means of the oil component exuding out of grease and to enhance the durability and life of the bearing. To achieve this object, the present invention provides a bearing apparatus which comprises a bearing, at least one end face of the bearing adjoining an end member having a concave grease pocket formed therein, the bearing including an outer race whose bore surface on its rib avoids projecting from the inner periphery of the grease pocket in the end member. Incidentally, the present invention is applicable not only in the case where the bearing has only one of its end faces adjoining the end member, but also in the case where the bearing has both end faces adjoining such end members.

Since the bore surface on the rib of the outer race is formed to avoid projecting from the inner periphery of the grease pocket in the end member, the rib of the outer race creates no barrier on the way from the grease pocket in the end member to the inside of the bearing. This facilitates adequate supply of the grease's oil component from the grease pocket to the inside of the bearing.

Moreover, it is desirable in the present invention that the outer race be tapered over the bore surface on the rib to its rolling contact surface, or that the end member be tapered over the inner periphery of the grease pocket to the bore surface on the rib of the outer race. In such cases, the oil component of the grease can simply flow down from the grease pocket to the inside of the bearing, allowing the oil component of the grease supplied to flow into the rolling contact surface of the outer race smoothly. Incidentally, the tapering may be applied to either the bore surface of the rib on the outer race or the inner periphery of the grease pocket, or both.

Furthermore, the external surfaces of the outer race are desirably covered with an insulation film whose inner end face is flush with the bore surface on the rib of the outer race. By this means, the oil component of the grease can be readily supplied from the grease pocket into the bearing even when the present invention is applied to a bearing that has an insulation film for preventing galvanic corrosion.

The bearings stated above are applicable for those incorporated into a railcar main motor or the like to support the armature shaft rotatably.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 1(a) and 1(b) are radial sectional views of a rolling bearing for use with a load fixed to the outer race, showing a cage of inner constraint type and a cage of outer constraint type, respectively;

FIGS. 2(a) and 2(b) are radial sectional views of a rolling bearing for use with a load fixed to the inner race, showing a cage of outer constraint type and a cage of inner constraint type, respectively;

DETAILED DESCRIPTION OF THE PREFERRED EMBODIMENTS

Now, preferred embodiments of the rolling bearing according to the present invention will be described with reference to FIGS. 1(a) through 8.

Figure 8:
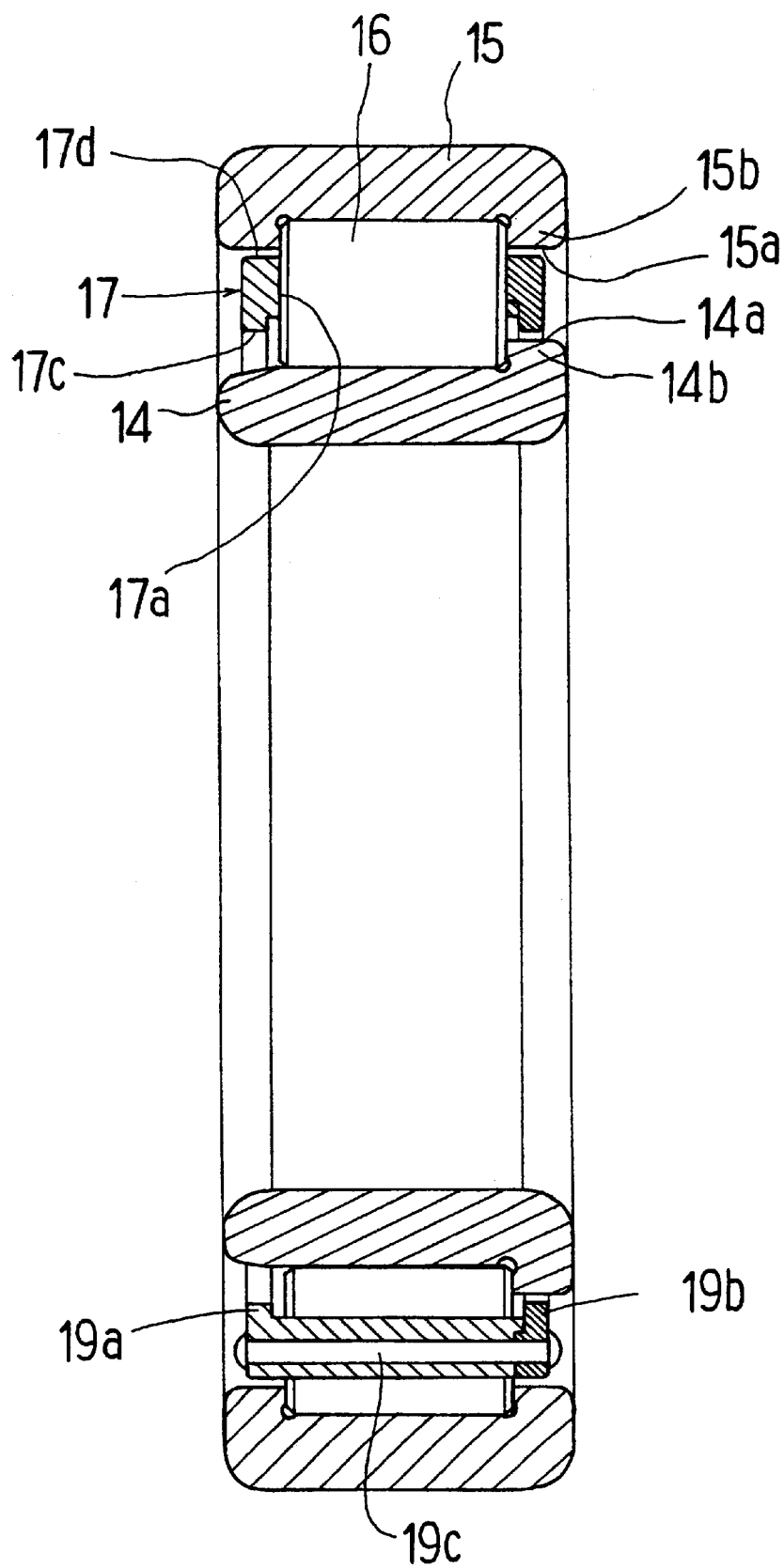
FIG. 8 is an axial sectional view of a cylindrical roller bearing.

FIG. 8 shows a kind of rolling bearing, or a cylindrical roller bearing. This cylindrical roller bearing is essentially composed of: an inner race 14 and an outer race 15 constituting a pair of races; a plurality of cylindrical rollers (rolling elements 16) interposed between the inner and outer races 14 and 15; and an annular cage 17 for retaining the rolling elements 15 at regular intervals along the circumferential direction. When the inner race 14 is to be rotated, the inner race 14 is fitted and fastened onto a rotating member such as a rotating shaft, and the outer race 15 is fixed to a stationary member such as a housing. In contrast, when the outer race 15 is to be rotated, the inner race 14 is fixed to a stationary member and the outer race 15 is fastened to a rotating member.

In the present invention, a rolling bearing for use with the inner race rotated has a cage that is guided with outer regions of its pocket surfaces in contact with rolling elements. In other words, the cage is of rolling element guided type where its rotation is guided by the rolling elements, and of outer constraint type where the rolling elements are constrained from the outer-diameter side of the cage. Hereinafter, explanation will be given of why a bearing of outer constraint type is used under the load fixed to the outer race. (Parenthetically, the following explanation will neglect centrifugal effects on the rolling elements for the sake of simplicity.)

Generally, a cage makes slide contact with rolling elements at pocket surfaces within the bearing load zone and ahead of the direction of rotation, whereby the cage receives driving forces from the rolling elements for rotation. Accordingly, the only bearing components that have a force to drive the cage 17 during the rotation of the inner or outer race are the rolling elements within the load zone. Among such rolling elements, the rolling element 16a being about to exit the load zone (see FIGS. 1(a) through 2(b)) has the strongest driving force.

Suppose here that the cage 17 is of inner constraint type, constraining the rolling elements from the inner-diameter side as shown in FIG. 1(a). Incidentally, the reference symbol P in the figure represents the load and S the load zone; and so in the other figures. A force $F_1$ acting on the drive portion A of the cage 17 from the rolling element 16a presses a rolling element 16b having no cage-driving force (=a rolling element driven by the cage) against the stationary race, i.e. the outer race 15, through the medium of the cage 17 (since the force $F_1$ causes a relative displacement of the cage 17 to the left in the figure). Here, the constraint portion B of the cage 17 acts as a brake on the rotation of the rolling element 16b. The rolling element 16b pressed against the outer race 15 in turn acts as a brake on the rotation of the cage 17 (the force $F_1'$ in the figure). As a result, the cage 17 is put between the forward and backward forces $F_1$ and $F_1'$, and therefore the driving force on the drive portion A increases to overcome the brake force on the constraint portion B. This causes a rise in frictional force at the drive portion A and the constraint portion B, generating a larger amount of heat. Pressed against the outer race 15, the rolling element 16b loses contact with the rotating race, i.e., the inner race 14 (due to bearing clearances). This prevents the rolling element 16b from receiving a moment necessary for its rotation and revolution from the inner race 14. Consequently, additional heat may be generated by a frictional force between the outer race 15 and the rolling element 16b whose rotation as well as revolution is braked by the constraint portion B.

Now, explanation will be directed to the case where a rolling element guided cage 17 of outer constraint type is used with the load fixed to the outer race, as shown in FIG. 1(b). A force $F_2$ acting on the drive portion A of the cage 17 from the rolling element 16a presses a rolling element 16c having no cage-driving force (=a rolling element driven by the cage) against the rotating race, i.e. the inner race 14, through the medium of the cage 17. Pressed against the inner race 14, the rolling element 16c starts its positive rotation. If the cage 17 so presses the rolling element 16c against the inner race 14 as to brake the rotation thereof, then the rolling element 16c is going to make a revolution together with the inner race 14 (at a speed approximately twice that of normal rolling). In either case, the frictional force ends up contributing to the revolution of the cage 17 ($F_2'$). Here, in contrast to the inner constraint type described above, the cage 17 is subjected to only forward forces, which reduces the frictional forces at the constraint portion B and the drive portion A. This results in less generation of heat as compared to the inner constraint type.

Moreover, in the present invention, a rolling bearing for use with its outer race rotated has a cage that is guided with inner regions of its pocket surfaces in contact with rolling elements. That is, this cage is of rolling element guided type where its rotation is guided by the rolling elements, and of inner constraint type where the rolling elements are constrained from the inner-diameter side. Hereinafter, explanation will be given of why a bearing of inner constraint type is used under the load fixed to the inner race.

Suppose that the cage 17 is of outer constraint type as shown in FIG. 2(a). A force $F_3$ acting on the drive portion A of the cage 17 from the rolling element 16a presses a rolling element 16c having no cage-driving force (=a rolling element driven by the cage) against the stationary race, i.e. the inner race 14, through the medium of the cage 17. The constraint portion B of the cage 17 acts as a brake on the rotation of the rolling element 16c. This rolling element 16c pressed against the inner race 14 in turn acts as a brake on the rotation of the cage 17 (the force $F_3'$ in the figure). As a result, the cage 17 is put between the forward and backward forces $F_3$ and $F_3'$, whereby the frictional forces at the drive portion A and the constraint portion B increase to generate a larger amount of heat. Pressed against the inner race 14, the rolling element 16c loses contact with the rotating race, i.e., the outer race 15. This prevents the rolling element 16c from receiving a moment necessary for its rotation and revolution from the outer race 15. Consequently, additional heat may be generated by a frictional force between the inner race 14 and the rolling element 16c whose rotation as well as revolution is braked by the constraint portion B.

Now, explanation will be directed to the case where a rolling element guided cage 17 of inner constraint type is used with the load fixed to the inner race, as shown in FIG. 2(b). A force $F_4$ acting on the drive portion A of the cage 17 from the rolling element 16a presses a rolling element 16b having no cage-driving force (=a rolling element driven by the cage) against the rotating race, i.e. the outer race 15, through the medium of the cage 17. Pressed against the outer race 15, the rolling element 16b starts its positive rotation and revolution to obtain a cage-driving force ($F_4'$). Here, in contrast to the outer constraint type described above, the cage 17 is subjected to only forward forces, which reduces the frictional forces at the constraint portion B and the drive portion A. This results in less generation of heat as compared to the outer constraint type. Pressed against the outer race 15, the rolling element 16b also receives a moment for its rotation and revolution, thereby contributing to the rotation of the cage 17. Consequently, the frictional forces at the constraint portion B and the drive portion A decrease to reduce the generation of heat as compared to the outer constraint type mentioned above.

The cage 17 is of rolling element guided type. More specifically, the cage 17 is designed so as to keep its inner and outer surfaces 17c and 17d from contact with the outer periphery 14a of the inner race 14 (the outer periphery of the inner race rib 14b, in the figure) and the inner periphery 15a of the outer race 15 (the inner periphery of the outer race rib 15b, in the figure). The rotations of the cage 17 are guided only by the rolling elements 16. The cage 17 in the present embodiment is a machined cage fabricated by cutting material which consists of metals, resins, or the like. The cage 17 is composed of an annular, comb-like body 19a, an annular lid 19b, and rivets 19c for connecting the body 19a and the lid 19b. The body 19a and the lid 19b define spaces, or pockets 17a for retaining the rolling elements 16 at regular intervals along the circumferential direction. Each pocket 17a lies between a pair of circumferentially-opposed surfaces 17b (pocket surfaces). As shown in FIGS. 3 through 7, the pocket surface 17b are entirely or partially shaped into an arc having a diameter larger than that of the outer periphery of the rolling elements 16. Each pocket surface 17b and the outer periphery of the rolling element 16 create a pocket clearance 18 therebetween. These pocket clearances 18 provide flexibility for circumferential and radial relative motions between the cage 17 and the rolling elements 16. Parenthetically, FIGS. 3–7 show a rolling element 16 in its neutral position, where the rolling element 16 is circumferentially sandwiched between two pocket clearances 18 of the same width.

Like FIG. 1(b), each of FIGS. 3–7 shows an outer-constraint-typed cage 17 that is guided for rotation with outer regions of its pocket surfaces 17b (in particular, outer regions of those pocket surfaces ahead of the rotational direction) in contact with rolling elements 16. Any of these cages 17 is effective as the measures for suppressing a rise in temperature on the use condition that the outer race 15 is fixed and the inner race 14 is rotated as mentioned above, or more particularly, that the direction of load (the load vector) is stationary to the outer race 15 and rotational with respect to the inner race 14.

Figure 3:
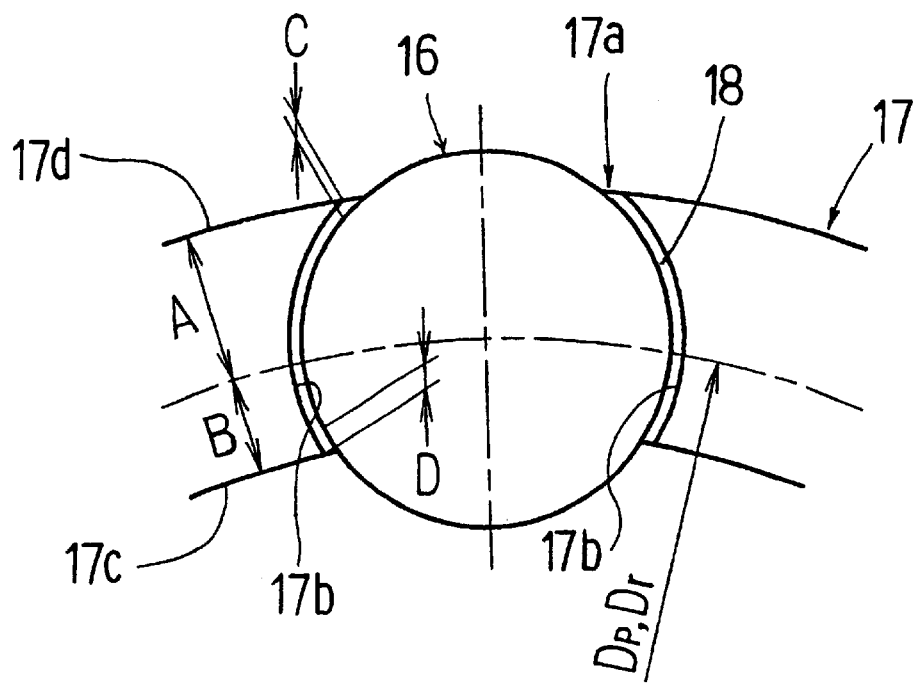
FIG. 3 is a radial sectional view showing a rolling element guided cage of outer constraint type.

The cage 17 of FIG. 3 has a cage-pocket PCD (Dp) nearly equal to the rolling-element PCD (Dr), i.e. Dr≈DP, and an outer thickness A greater than an inner thickness B (A>B) with both the PCDs as the border. In this case, the distance between the rolling element 16 and each pocket surface 17b (the distance in the radial direction) becomes smaller in the outer region C than in the inner region D (C<D). Parenthetically, "PCD" is an abbreviation for "pitch circle diameter."

Figure 4:
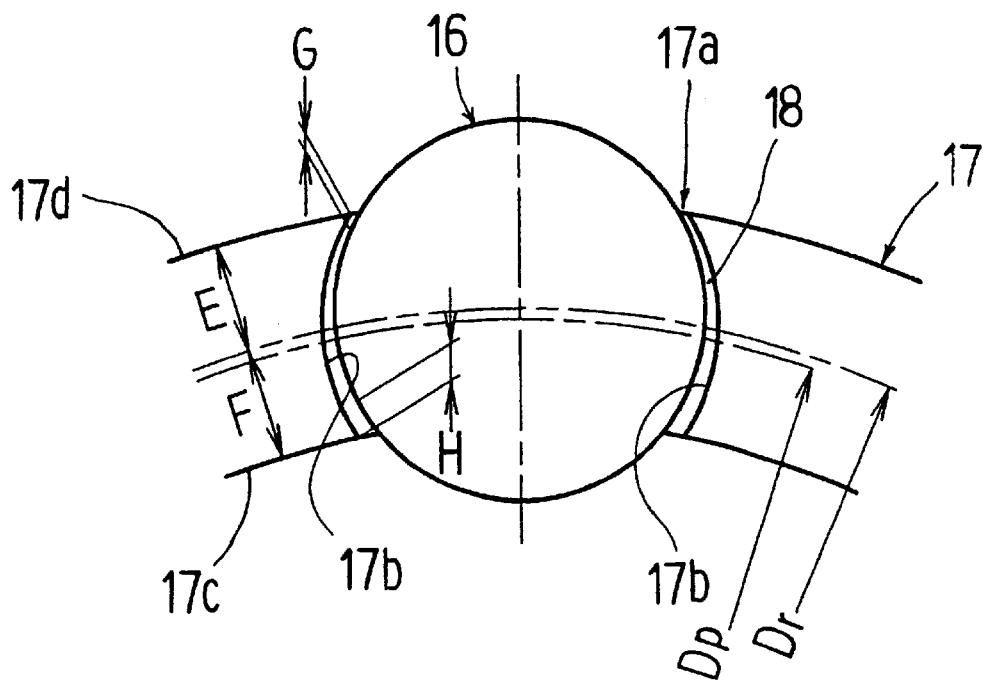
FIG. 4 is a radial sectional view showing another rolling element guided cage of outer constraint type.

The cage 17 of FIG. 4 has a cage-pocket PCD (Dp) smaller than the rolling-element PCD (Dr), i.e. Dp<Dr, and an outer thickness E nearly equal to an inner thickness F (E≈F) with the rolling-element PCD (Dr) as the border. Here, the above-mentioned radial distance between the rolling element 16 and each pocket surface 17b becomes smaller in the outer region G than in the inner region H (G<H).

Figure 5:
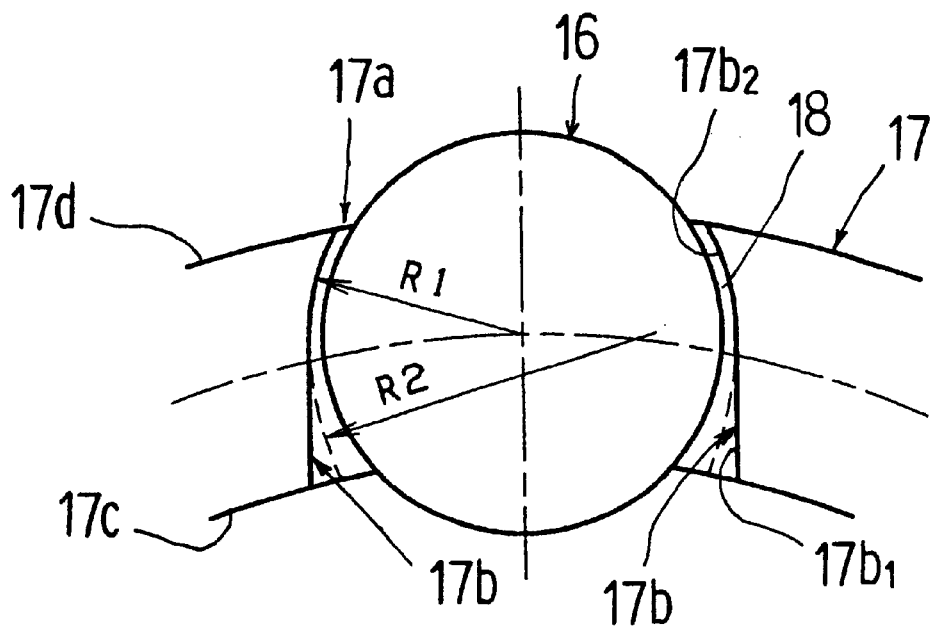
FIG. 5 is a radial sectional view showing yet another rolling element guided cage of outer constraint type.

The cage 17 of FIG. 5 has pocket surfaces 17b whose inner regions are formed into a radial straight surface $17b_1$, instead of an arcuate surface. The remaining arcuate surfaces $17b_2$ may be replaced with a straight surface that forms a certain angle with the radial direction. The aforementioned straight surfaces $17b_1$ may otherwise be formed into an arcuate surface having a curvature R2 greater than the curvature R1 of the arcuate surfaces $17b_2$ (shown by the broken lines). The pocket surfaces may also be a composite of several curved and/or straight surfaces.

Figure 6:
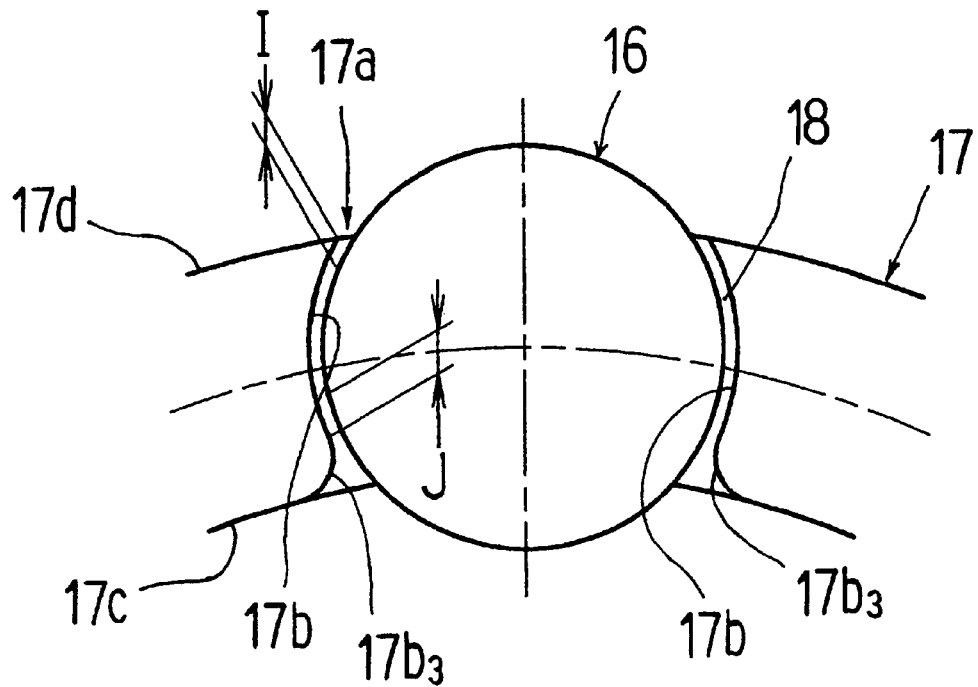
FIG. 6 is a radial sectional view showing yet another rolling element guided cage of outer constraint type.
Figure 7:
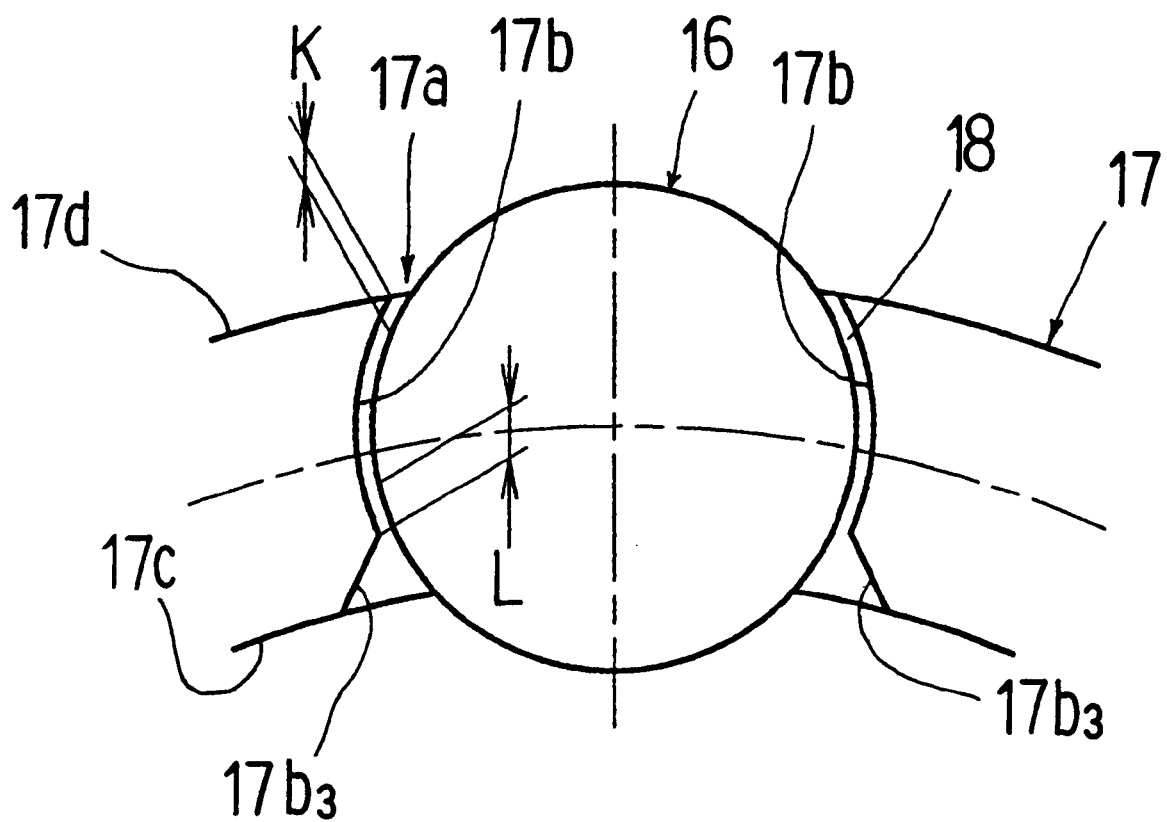
FIG. 7 is a radial sectional view showing yet another rolling element guided cage of outer constraint type.

In FIGS. 6 and 7, the pocket surfaces 17b have chamfers $17b_3$ on the inner-diameter sides thereof. The chamfer dimension of the chamfers $17b_3$ is greater than that on the outer-diameter side. FIGS. 6 and 7 illustrate chamfers $17b_3$ of arcuate shape and of straight shape, respectively. Here, the radial distances between the rolling elements 16 and the pocket surfaces 17b become smaller in the outer regions I and K than in the inner regions J and L (I<J, K<L).

In the use mode contrary to that employed above, i.e., when the inner race 14 is fixed and the outer race 15 is rotated, or more particularly, when the direction of load (the load vector) is stationary to the inner race 14 and rotational with respect to the outer race 15, rolling bearing guided cages 17 of inner constraint type shown in FIG. 2(b) are used as the measures to suppress a rise in temperature. These inner-constraint-typed cages are obtained from the configurations shown in FIGS. 3–7, by reversing the dimensional relationship, large and small, between the inner and outer regions as to the radial distance between the rolling element 16 and the pocket surface 17b (omitted of illustration). The general configurations of the cages are as follows:

In FIG. 3, A is made smaller than B (where Dr≈Dp) to make C greater than D.

In FIG. 4, Dp is made greater than Dr (where E≈F) to make G greater than H.

In FIG. 5, the inner pocket surfaces $17b_1$ of the pockets 17a are shaped into an arcuate surface while the outer pocket surfaces $17b_2$ are into a radial straight surface. The outer pocket surfaces $17b_2$ may be formed into an arcuate surface having a curvature greater than that of the inner arcuate surfaces. The pocket surfaces 17b may be a composite of several curved and/or straight surfaces.

In FIGS. 6 and 7, chamfers $17b_3$ are arranged on the outer regions of the pocket surfaces 17b. The chamfer dimension of the chamfers $17b_3$ is set to be greater than that on the inner-diameter sides. Both arcuate and straight surfaces are applicable to the chamfers.

Those cages 17 described above are not only suitable to the aforementioned cylindrical roller bearings, but also applicable to other roller bearings such as tapered roller bearings, along with ball bearings such as deep groove ball bearings and angular contact ball bearings. Besides, while the cages shown in FIGS. 1(a) through 7 are of machined type, the present invention is also applicable to stamped cages stamped out with a press or the like.

The following are the results of comparison tests made to prove the effect of the present invention.

Test 1: Test bearings were a bearing A using a machined cage of outer race guided type and a bearing B using a machined cage of outer constraint, rolling element guided type (both cylindrical roller bearings). The test was conducted under the condition of a radial load Fr=4.9 kN, rotations of the inner race at 1800 rpm, and oil-bath lubrication. After a 1.5-hour run, the outer race of the bearing A was measured and found to be 123° C. in temperature, whereas that of the bearing B was 109° C. This proved approximately 14° C. suppression of temperature rise.

Test 2: Test bearings were a bearing C using a machined cage of inner constraint, rolling element guided type and a bearing D using a machined cage of outer constraint, rolling element guided type (both cylindrical roller bearings). The test was conducted under the condition of a radial load Fr=78.4 kN, rotations of the inner race at 2275 rpm, and grease lubrication. After stabilization of temperature (after an about-24-hour run), the outer race of the bearing C was measured and found to be 86° C., whereas that of the bearing D was 71° C. This proved approximately 15° C. suppression of temperature rise.

The foregoing test results confirm that the present invention is effective as the measures to suppress a rise in temperature.

Figure 16:
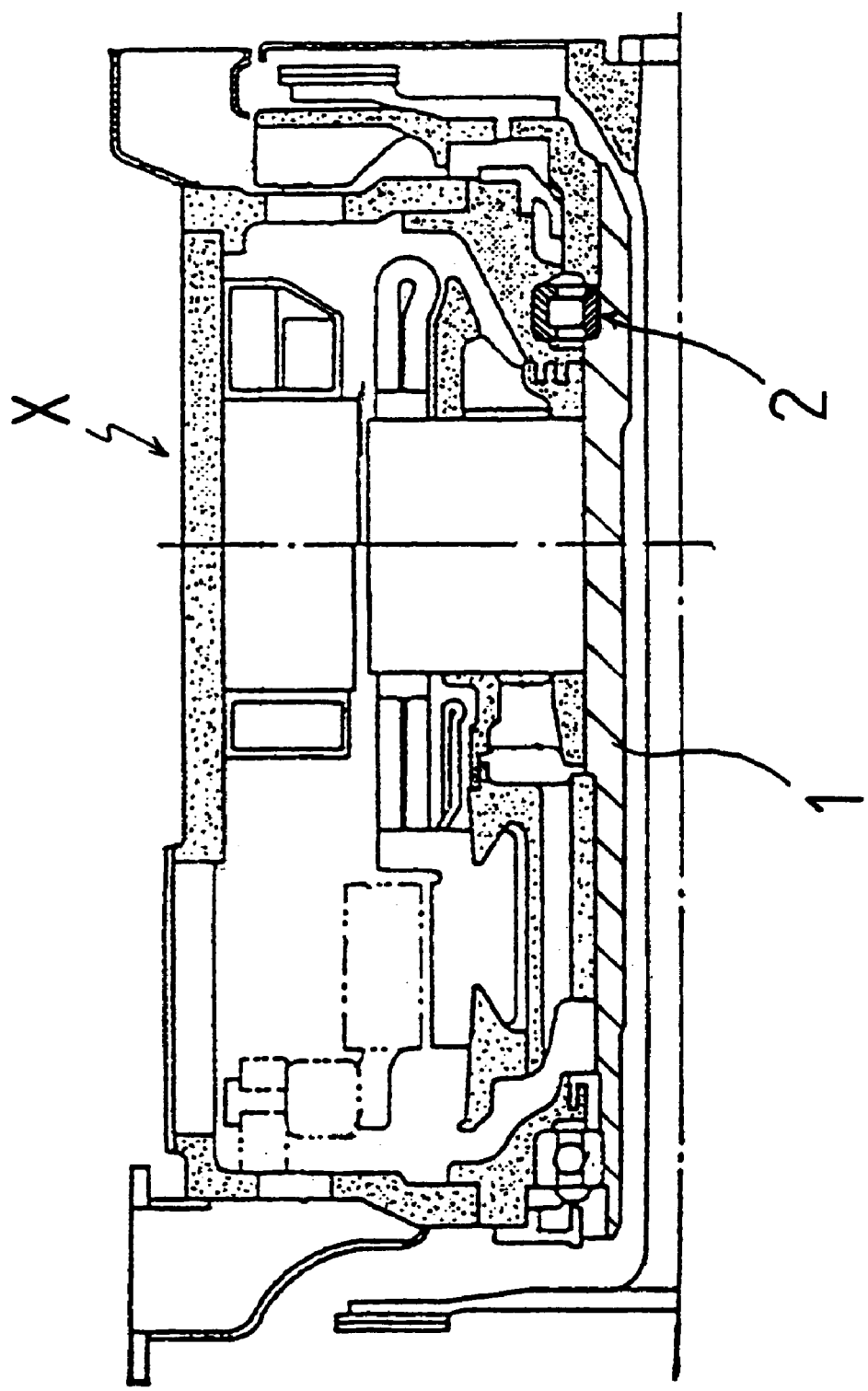
FIG. 16 is a partly-omitted sectional view of a main motor mounted on a railcar.
Figure 17:
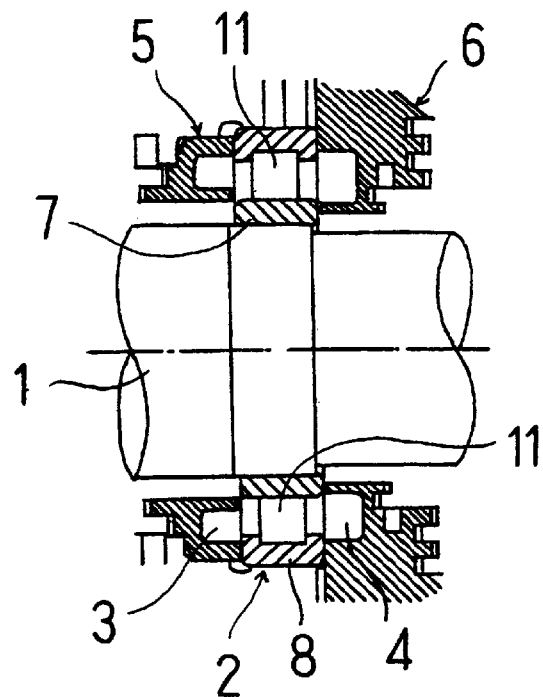
FIG. 17 is a partly-omitted sectional view of a bearing apparatus incorporated in the main motor for a railcar.
Figure 18:
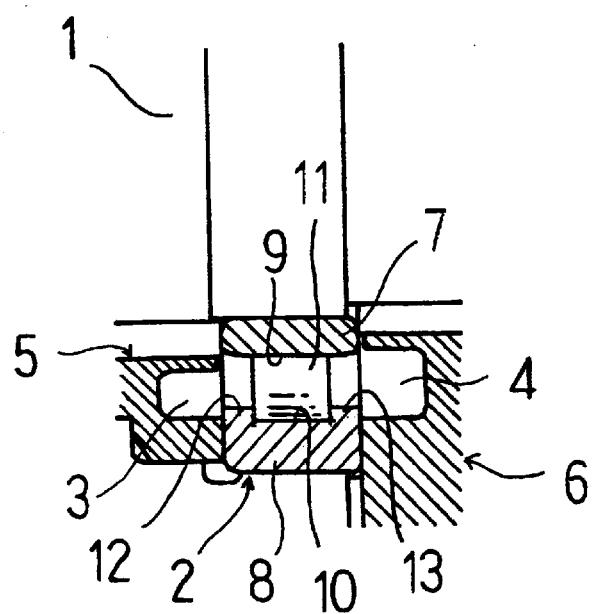
FIG. 18 is an enlarged view of FIG. 17.

Next, embodiments of the bearing apparatus according to the present invention will hereinafter be described in detail. Incidentally, the bearing apparatuses of the present invention are to be incorporated into e.g. a main motor mounted on a railcar (see FIG. 16) to support its armature shaft rotatably. However, it is obvious that these bearing apparatus are also applicable to various applications other than the railcar's main motor.

Figure 9:
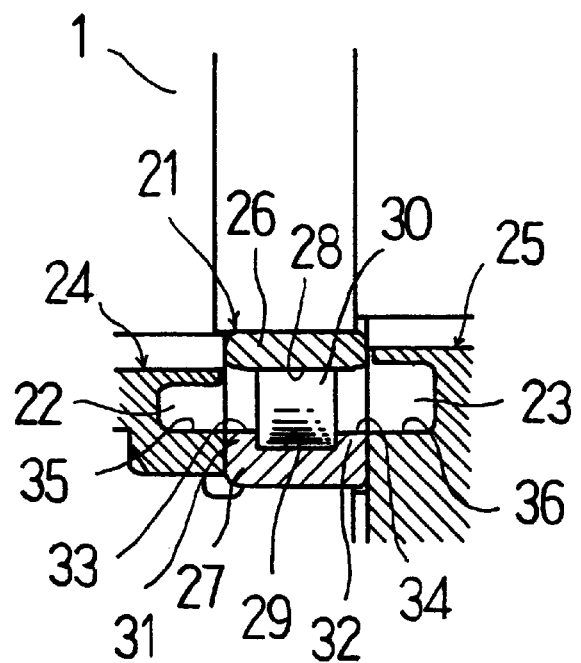
FIG. 9 is an enlarged sectional view of a bearing apparatus according to an embodiment of the present invention, in which the bore surfaces on the ribs of the outer race are flush with the inner peripheries of the grease pockets in the end members.

The rolling bearing apparatus in the embodiment shown in FIG. 9 comprises a bearing 21 for rotatably supporting an armature shaft 1 of a main motor mounted on a railcar. The bearing 21 is arranged with both end faces adjacent to end members 24 and 25 having grease pockets 22 and 23 for reserving grease, respectively. The oil component of the grease in these grease pockets 22 and 23 is supplied into the bearing 21 to provide long-term lubrication therefor.

This bearing 21 is essentially composed of an inner race 26 fitted and fastened onto the armature shaft 1, an outer race 27 positioned and fixed to a not-shown housing or the like, and rolling elements 30 such as cylindrical rollers. The rolling elements 30 are interposed between rolling contact surfaces 28 and 29 formed on the raceways of the inner and outer rings 26 and 27, respectively. On both axial ends of the outer race 27 are formed ribs 31 and 32 each projecting radially inwardly from the rolling contact surface 29.

Meanwhile, the end members 24 and 25, arranged to adjoin both ends of the bearing 21, have the grease pockets 22 and 23 which are formed to communicate with open ends of the bearing 21 between the inner and outer races 26 and 27. These grease pockets 22 and 23 reserve the grease whose oil component flows over the ribs 31 and 32 of the outer race 27 to the inside of the bearing 21 to carry out supplying of lubricant.

Figure 10:
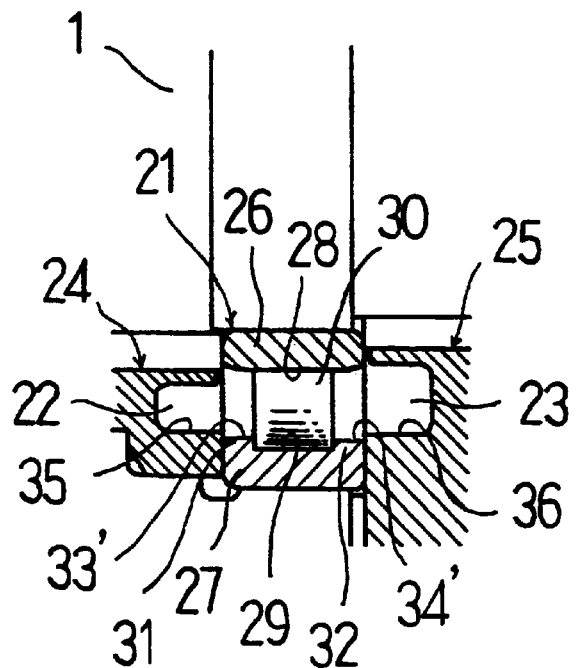
FIG. 10 is an enlarged sectional view of a bearing apparatus according to another embodiment of the present invention, in which the bore surfaces on the ribs of the outer race are located radially outside the inner peripheries of the grease pockets in the end members.

In the embodiment shown in FIG. 9, the bore surfaces 33 and 34 on the rigs 31 and 32 of the outer race 27 are formed to be flush with the inner peripheries 35 and 36 of the grease pockets 22 and 23, respectively. Incidentally, the bore surfaces 33 and 34 on the ribs 31 and 32 of the outer race 27 just have to avoid projecting from the inner peripheries 35 and 36 of the grease pockets 22 and 23 in the end members 24 and 25. For example, as in the embodiment shown in FIG. 10, the bore surfaces 33' and 34' on the ribs 31 and 32 of the outer race 27 may be located radially outside the inner peripheries 35 and 36 of the grease pockets 22 and 23 in the end members 24 and 25, respectively.

Since the bore surfaces 33 (33') and 34 (34') on the ribs 31 and 32 of the outer race 27 are formed to avoid projecting from the inner peripheries 35 and 36 of the grease pockets 22 and 23 in the end members 24 and 25, the ribs 31 and 32 constitute no barriers on the ways from the grease pockets 22 and 23 in the end members 24 and 25 to the inside of the bearing 21. This barrier-free configuration facilitates adequate supply of the grease's oil component from the grease pockets 22 and 23 to the inside of the bearing 21.

Figure 11:
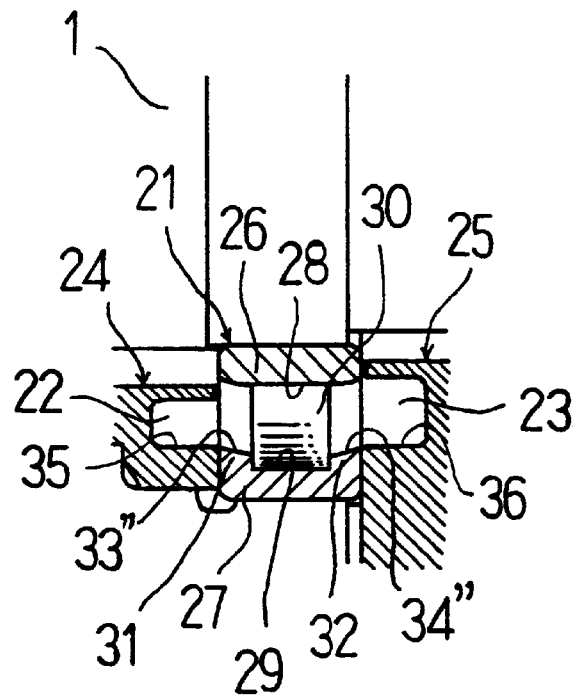
FIG. 11 is an enlarged sectional view of a bearing apparatus according to yet another embodiment of the present invention, in which the outer race is tapered over the bore surfaces on its ribs.
Figure 12:
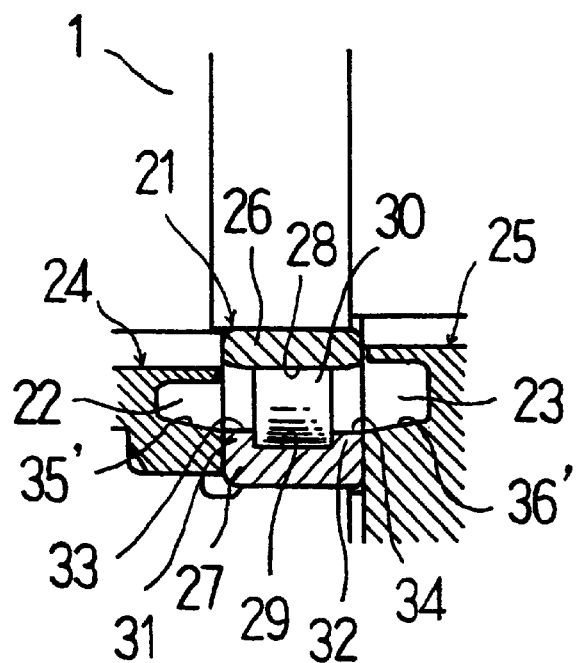
FIG. 12 is an enlarged sectional view of a bearing apparatus according to yet another embodiment of the present invention, in which the end members are tapered over the inner peripheries of the grease pockets.

AS in the next embodiment shown in FIG. 11, the outer race 27 may be tapered over the bore surfaces 33" and 34" on the ribs 31 and 32 to its rolling contact surface 29. In this case, the grease's oil component simply flows down from the grease pockets 22 and 23 to the inside of the bearing 21. This allows the oil component of the grease supplied to flow to the rolling contact surface 29 on the outer race 27 smoothly. Moreover, as in the embodiment shown in FIG. 12, the grease pockets 22 and 23 in the end members 24 and 25 may be tapered over the inner peripheries 35' and 36' to the bore surfaces 33 and 34, respectively. Furthermore, though omitted of illustration, the tapering may be applied to both the bore surfaces of the ribs 31, 32 on the outer race 27 and the inner peripheries of the grease pockets 22, 23 in the end members 24, 25.

Figure 13:
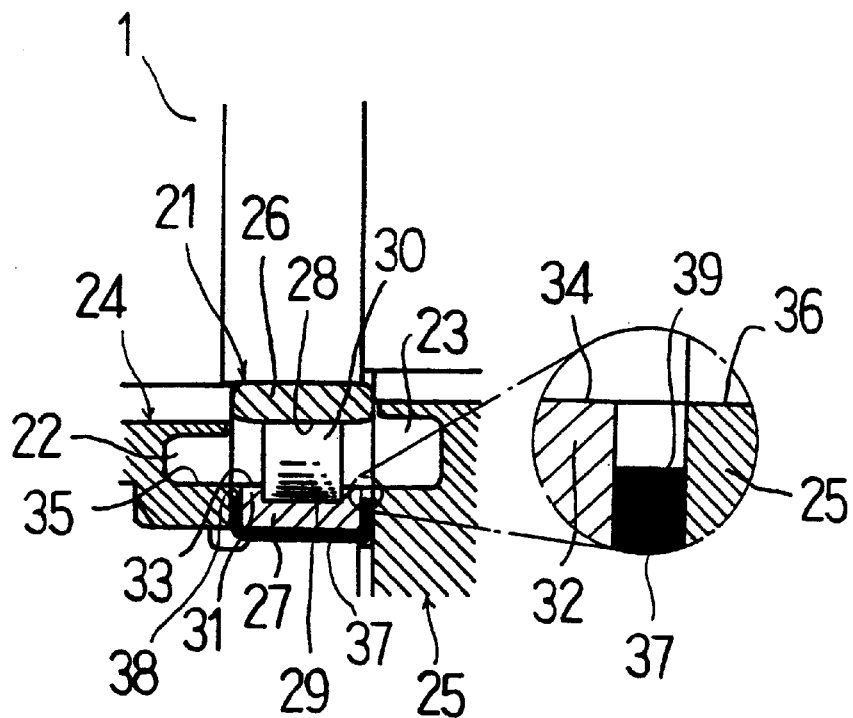
FIG. 13 is an enlarged sectional view of a bearing apparatus for illustrating a problem with a galvanic-corrosion-resistant insulation film formed on the surfaces of the outer race.

To avoid a phenomenon in which a leakage current from the housing or the armature shaft 1 flows between the rolling elements 30 and the inner or outer race 26, 27 to cause galvanic corrosion, the bearing 21 incorporated into a main motor on a railcar or the like has such a configuration as shown in FIG. 13 to interrupt the external current. That is the bearing 2 has an electrically insulative film 37 (insulation film) formed on the external surfaces, i.e. the outside surface and end faces, of the race 27.

In the galvanic-corrosion-resistant bearing 21 of this type, however, the inner end faces 38 and 39 of the insulation film 37 may differ in level from the bore surfaces 33 and 34 on the ribs 31 and 32 of the outer race 27, forming concave grooves between the ribs 31 and 32 of the outer race 27 and the grease pockets 22 and 23 in the end members 24 and 25. The concave grooves can trap the oil component of the grease to harden the supply of the grease's oil component from the grease pockets 22 and 23 to the inside of the bearing 21.

Figure 14:
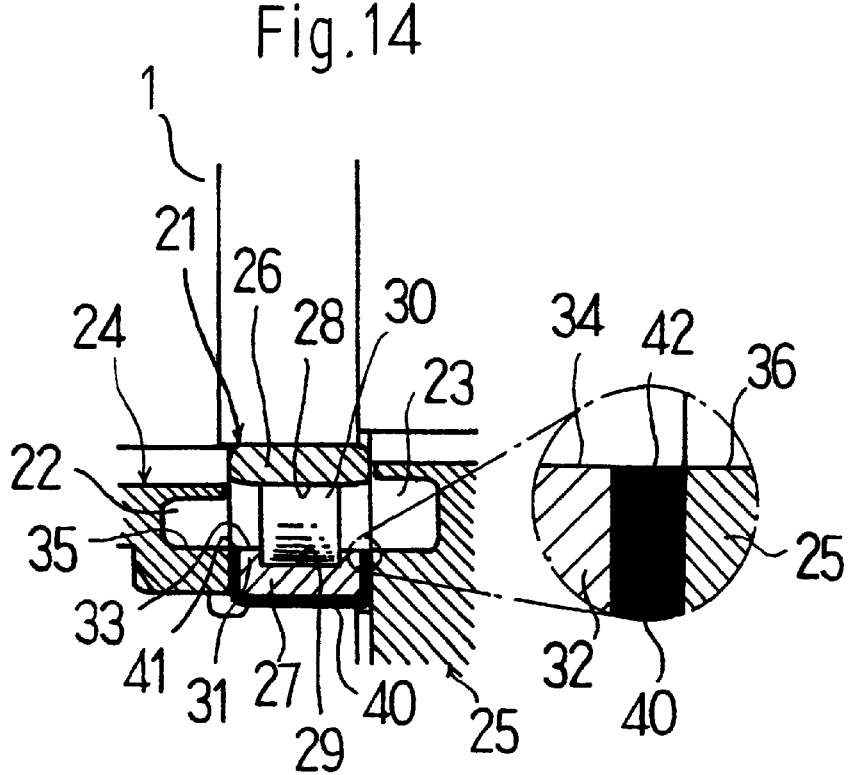
FIG. 14 is an enlarged sectional view of a galvanic-corrosion-resistant bearing apparatus according to yet another embodiment of the present invention, in which the bore surfaces on the ribs of the outer race are flush with the inner end faces of the insulation film.

On that account, in the bearing 21 according to the embodiment shown in FIG. 14, the inner end faces 41 and 42 of the insulation film 40 covering the external surfaces of the outer race 27 are made flush with the bore surfaces 33 and 34 on the ribs 31 and 32 of the outer race 27. This precludes the difference in level between the bore surfaces 33 and 34 on the ribs 31 and 32 of the outer race 27 and the inner end faces 41 and 42 of the insulation film 40 even when an insulation film is formed for the sake of preventing galvanic corrosion. Here, the continuity in level can be maintained all the ways from the inner peripheries 35 and 36 of the grease pockets 22 and 23 to the bore surfaces 33 and 34 on the ribs 31 and 32 of the outer race 27, respectively. This facilitates adequate supply of the grease's oil component from the grease pockets 22, 23 to the inside of the bearing 21.

Incidentally, the insulation films 37 and 40 mentioned above can be formed of material that chiefly consists of polyphenylene sulfide (PPS) resin containing glass fibers and alumina type ceramics, for improved anti-creep characteristics and higher thermal conductivity.

Figure 15:
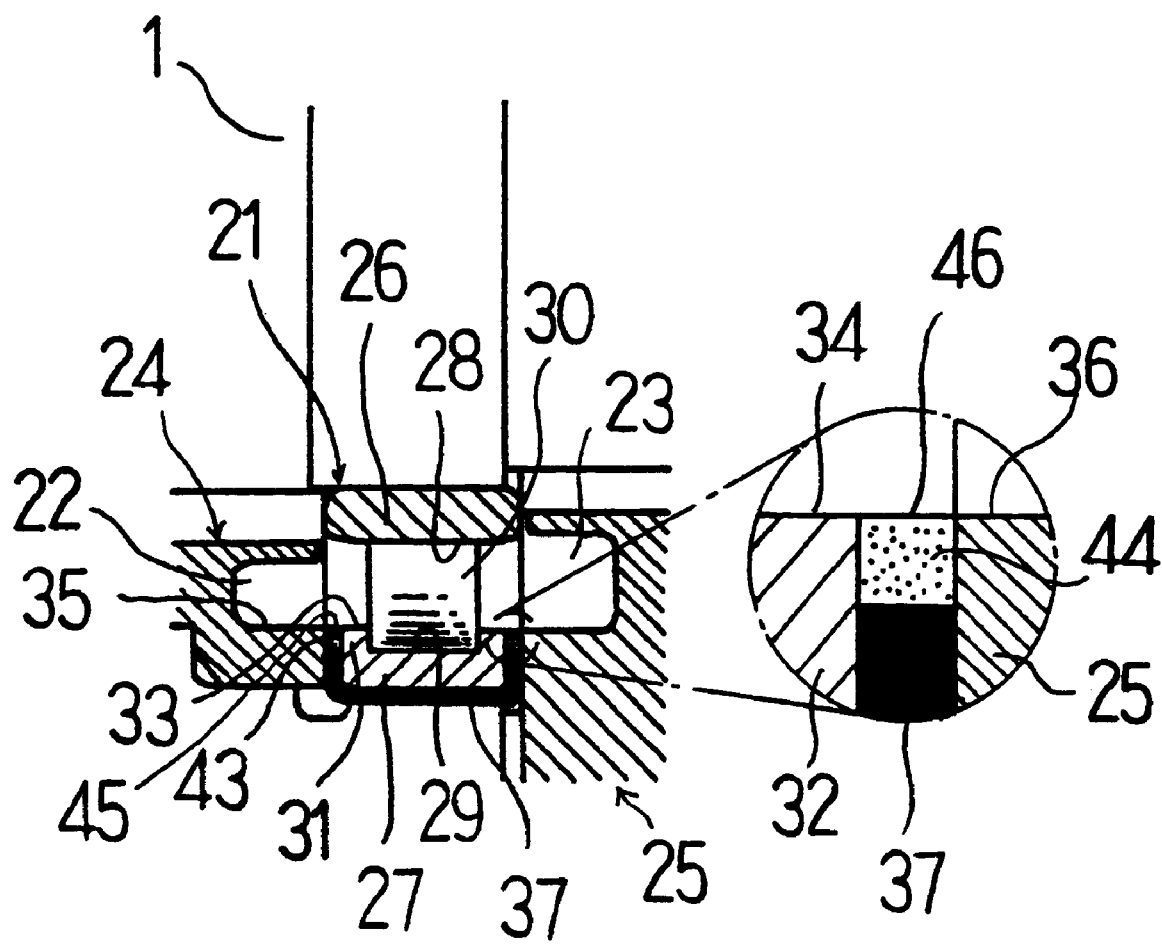
FIG. 15 is an enlarged sectional view of a galvanic-corrosion-resistant bearing apparatus according to still another embodiment of the present invention, in which the bore surfaces on the ribs of the outer race and the inner peripheries of the grease pockets in the end members are bridged by another insulation film.

In the embodiment described before, the insulation film 40 of PPS resin is extended so that its end portions 41 and 42 reach the bore surfaces 33 and 34 on the ribs 31 and 32 of the outer race 27 to eliminate the differences in level therebetween. Alternatively, when the outer race 27 has the insulation film 37 (see FIG. 13) formed on its external surfaces as in another embodiment shown in FIG. 15, the aforementioned differences in level can be eliminated in the following way. That is, the concave grooves created between the rigs 31 and 32 and the end members 24 and 25 are filled with new insulation films 43 and 44 made of material different from the PPS resin used for the insulation film 37 but equivalent in insulating property, such as polyethylene resin. Thereby, the inner end faces 45 and 46 of the insulation films 43 and 44 can be made flush with the bore surfaces 33 and 34 on the ribs 31 and 32 of the outer race 27.

In this case, the continuity in level can also be maintained all the ways from the inner peripheries 35 and 36 of the grease pockets 22 and 23 to the bore surfaces 33 and 34 of the ribs 31 and 32 on the outer race 27, respectively. This facilitates adequate supply of the grease's oil component from the grease pockets 22 and 23 to the inside of the bearing 21.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A rolling bearing comprising:

a pair of races;

a plurality of cylindrical rolling elements interposed between said races; and a cage for retaining said cylindrical rolling elements, an inner race of said pair of races being rotated in operation, wherein said cage is guided with outer regions of curved pocket surfaces of said cage that are in contact with said cylindrical rolling elements, wherein the cage is subject only to forward forces from said cylindrical rolling elements, wherein frictional forces acting on said outer regions of said cage from said cylindrical rolling elements pressing thereon are reduced, and wherein each of said cylindrical rolling elements has a constant diameter throughout an entire length thereof.

2. The rolling bearing according to claim 1, wherein the rolling bearing is a cylindrical rolling bearing.

* * * * *